United States Patent
Masuki (10) Patent No.: US 8,265,472 B2
(45) Date of Patent: Sep. 11, 2012

(54) IMAGING APPARATUS (75) Inventor: Akihiko Masuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/010,359

(22) Filed: Jan. 20, 2011

(65) Prior Publication Data

US 2011/0188842 A1 Aug. 4, 2011

(30) Foreign Application Priority Data

Feb. 3, 2010 (JP) .................. 2010-021725

(51) Int. Cl.
*G03B 17/00* (2006.01)
*G03B 17/02* (2006.01)
(52) U.S. Cl. .......................... 396/72; 396/535
(58) Field of Classification Search ............ 396/72, 396/535, 542
See application file for complete search history.

(56) References Cited

U.S. PATENT DOCUMENTS

| 6,052,535 | A * | 4/2000 | Uno ................... 396/72 |
| 7,302,175 | B2 * | 11/2007 | Tsuji ................. 396/535 |
| 7,548,382 | B2 | 6/2009 | Kudoh |
| 2008/0204895 | A1 | 8/2008 | Kudoh |
| 2009/0219629 | A1 | 9/2009 | Kudoh |
| 2011/0013897 | A1 * | 1/2011 | Nagae ................. 396/89 |

FOREIGN PATENT DOCUMENTS

JP 2008-176049 7/2008

* cited by examiner

*Primary Examiner* — Christopher Mahoeny
(74) *Attorney, Agent, or Firm* — Cowan, Liebowitz & Latman, P.C.

(57) ABSTRACT

An imaging apparatus is provided with a lens barrel that includes a flexible substrate that is electrically connected to a magnetically driven apparatus and drive ring that drives the lens barrel by rotating. The drive rings include through grooves that pass through the drive ring and a flexible substrate passes therethrough from the inside to the outside of the lens barrel and a strobe cam that is provided on the outer circumferential side of the drive ring. In addition, the through groove and the strobe cam are disposed so as to coincide in the rotation direction of the drive ring.

8 Claims, 12 Drawing Sheets

IMAGING PLANE SIDE ←→ IMAGED OBJECT SIDE

IMAGING APPARATUS

BACKGROUND OF THE INVENTION

1. Field of the Invention

The present invention relates to an imaging apparatus.

2. Description of the Related Art

An imaging apparatus provided with external apparatuses such as a viewfinder, a zoom, and a pop-up strobe has been proposed in which the external apparatuses are driven by linking to the drive of the lens barrel. For example, Japanese Patent Laid-Open No. 2008-176049, FIGS. 3 to 6, discloses a barrel unit in which a cam plate that drives external apparatuses such as a viewfinder and a strobe and the like are linked to the extending action of the lens barrel from a storage position and the retracting action of the lens barrel to a storage position. In this barrel unit, a pin provided in a viewfinder cam plate and a pin provided in a moving cam ring pass through a groove hole shaped portion and directly abut, and the viewfinder cam plate is operated by being linked to the moving cam ring.

In the structure of the barrel unit proposed in Japanese Patent Laid-Open No. 2008-176049, cam plates are necessary as functioning portions that drive the external apparatuses such as the viewfinder and the strobe and the like, and the number of parts, including springs for urging the cam plates, increases. As a result, there is the problem that the cost of the camera overall increases. In addition, using a structure in a camera in which cams that drive external apparatuses are provided on a rotating tube that is provided at the outermost circumference of the barrel without cam plates can be considered. However, even using such a structure, a flexible substrate that is electrically connected from the inside to the outside of the barrel must be disposed so as not to interfere with the through groove. As a result, not only does the size of the camera increase, but there is the problem that the degree of freedom of design is compromised.

SUMMARY OF THE INVENTION

The present invention provides an imaging apparatus that enables laying out grooves used to drive external devices and grooves through which a flexible substrate is passed in a cylindrical member that drives a lens barrel without increasing the size of the imaging apparatus.

The imaging apparatus of an embodiment of the present invention includes a lens barrel including a magnetically driven apparatuses and a flexible substrate that is electrically connected to the magnetically driven apparatuses, and a cylindrical member that drives the lens barrel. The cylindrical member includes a first groove that passes through the cylindrical member and through which the flexible substrate can be passed from the inside to the outside of the lens barrel and a second groove that is provided on the outer circumferential side of the circumferential member. The first groove and the second groove are disposed so as to coincide with each other.

Further features of the present invention will become apparent from the following description of exemplary embodiments with reference to the attached drawings.

DESCRIPTION OF THE EMBODIMENTS

The imaging apparatus of a first embodiment of the present invention will be explained with reference to FIGS. 1A to 6. This imaging apparatus includes, for example, a zoom strobe and viewfinder as external apparatuses.

Figure 1A:
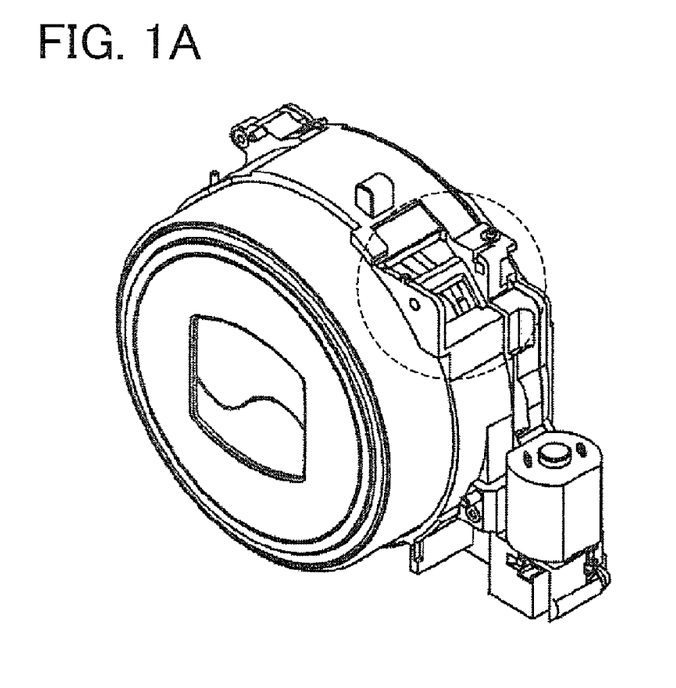
FIGS. 1A and 1B are examples in perspective view of a lens barrel that is included in an imaging apparatus.
Figure 1B:
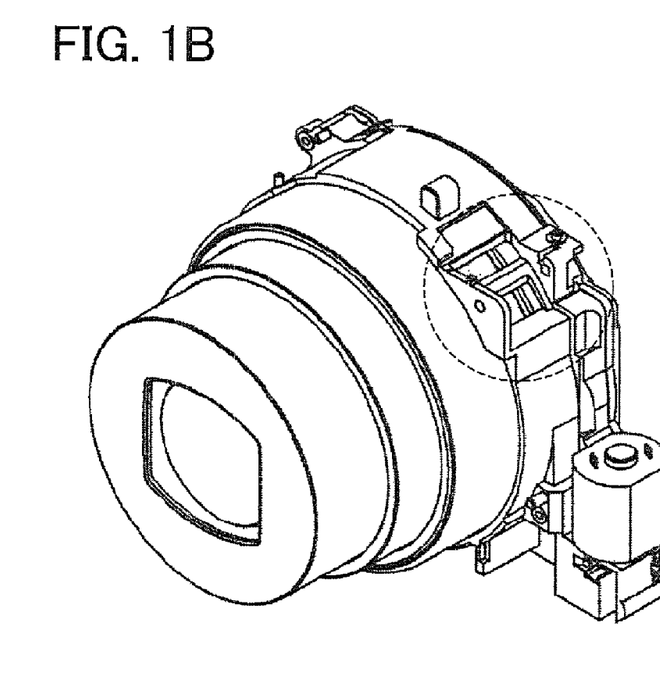

FIGS. 1A and 1B are examples in perspective view of a lens barrel that is included in an imaging apparatus of a first embodiment. FIG. 1A shows the state in which a lens barrel is housed. When in this state, a strobe and viewfinder shown by the dotted line portion in FIG. 1A are disposed at the SINK position. The "SINK position" corresponds to a non-imaging state. FIG. 1B shows a state in which the power of the imaging apparatus has been turned ON, and the lens barrel is extended, that is, the lens barrel is in an imaging state. When in this state, the strobe and viewfinder shown by the broken line in FIG. 1A are disposed at the WIDE position. The "WIDE position" corresponds to the wide angle state of the zoom lens mechanism provided in the imaging apparatus.

Figure 2:
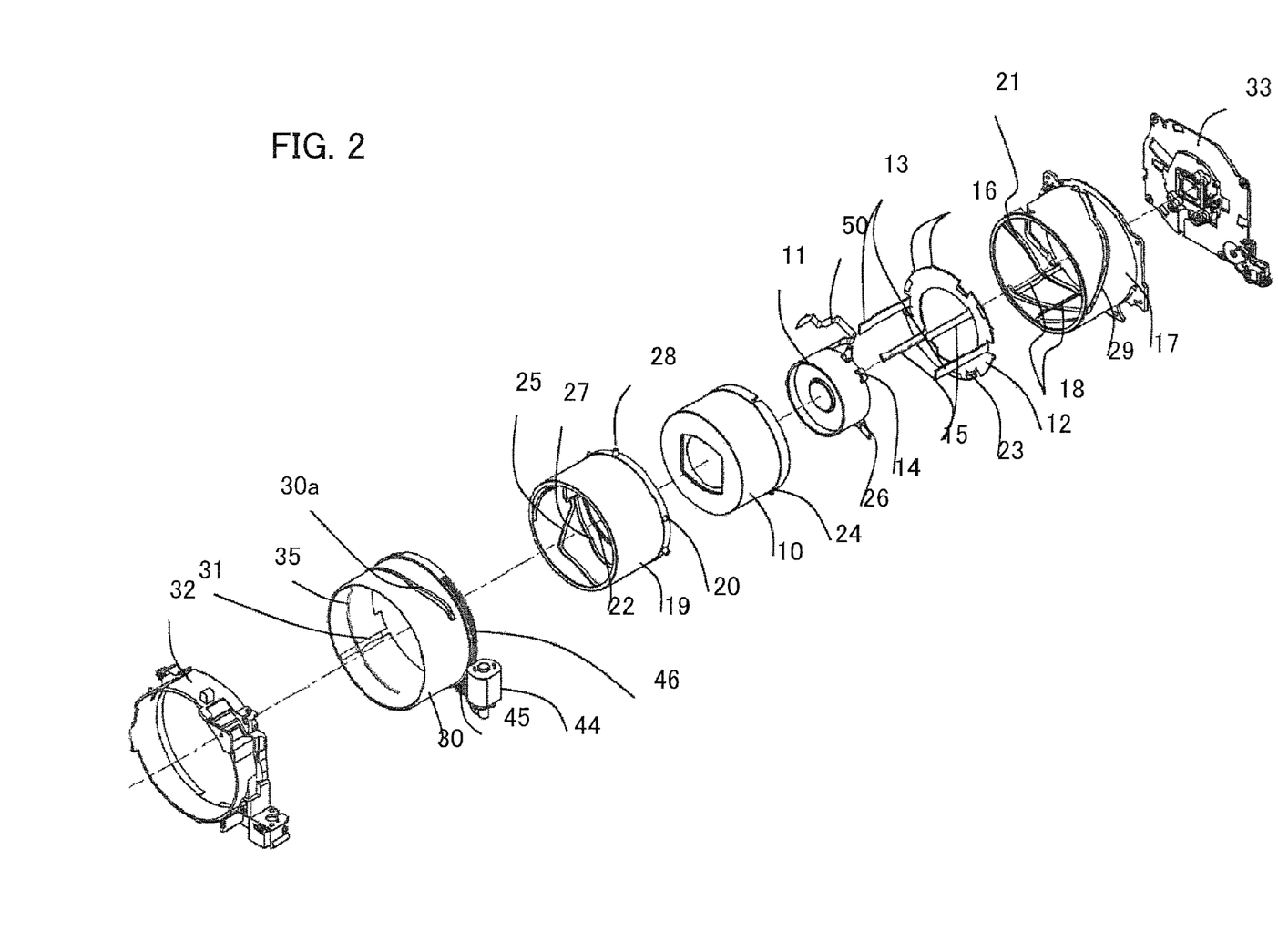
FIG. 2 is an example in exploded perspective view of the lens barrel.

FIG. 2 is an example in exploded perspective view of the lens barrel that is shown in FIGS. 1A and 1B. The optical system of the lens barrel shown in FIG. 2 includes a first group lens, a second group lens, and a third group lens, which is the focusing lens (not illustrated). The first group lenses are held by the first group lens holder 10 and the second group lenses are held by the second group lens holder 11. The rectilinear guiding plate 12 is provided with a plurality of projections 16 at the outer edge portion of a flange portion. A rotating action is regulated and the free movement in the optical axial direction is supported by these projections 16 engaging a plurality of grooves 18 that are provided in-plane on the stationary cam ring 17 and extend in an optical axial direction. The rectilinear guiding plate 12 is provided with first group guiding rods 13 that engage grooves (not illustrated) that are formed in-plane on the first group lens holder 10 and that extend in an optical axial direction, and support the first group lens holder 10 so as to be movable the optical axial direction. Similarly, second group guiding rods 15 that engage the second group rectilinear holes 14 integrally provided on the outer peripheral portion of the second group lens holder 11 and support the second group lens holder 11 so as to be movable in an optical axial direction. Thereby, the first group lens holder 10 and the second group lens holder 11 are formed so as to move freely in an optical axial direction.

The cam followers 20, which are provided on the outer surface of a moving cam ring 19 at three locations separated by equal angles, each cam-engage the three identically shaped cams 21 provided on the inner surface of a stationary cam ring 17. Accompanying the rotation of the moving cam ring 19, the engagement position of the cam follower 20 moves along the path of the cam 21, and the moving cam ring 19 can thereby extend and retract in an optical axial direction while rotating. Furthermore, a hook 23 of the rectilinear guide plate 12 engages a flange 22 provided on the in-plane back end portion of the moving cam ring 19, and the rectilinear guiding plate 12 thereby engages so as to rotate freely with respect to the moving cam ring 19. Thereby, accompanying the shift of the moving cam ring 19 in optical axial direction, the rectilinear guiding plate 12 can also shift together in an optical axial direction.

First group cam followers 24, which are provided on the outer surface of the first group lens folder 10 at three locations separated by equal angles, each cam-engage the three identically shaped first group cams 25 provided on the inner surface of the moving cam ring 19. Accompanying the rotation of the moving cam ring 19, the engagement positions of the first group cam followers 24 move along the path of the first group cams 25. In addition, because the first group lens holder 10 is guided so as to move in an optical axial direction, the first group lens holder 10 shifts in conformity to the amount of shift of the first group cam 25 in an optical axial direction accompanying the rotation of the moving cam ring 19.

The second group cam followers 26, which are provided on the outer surface of the second group lens holder 11 at three locations separated by equal angles, respectively cam-engage the three identically shaped second group cams 27 provided on the inner surface of the moving cam ring 19. Accompanying the rotation of the moving cam ring 19, the engagement positions of the second group cam followers 26 move along the path of the second group cam 27. In addition, because the second group lens holder 11 is guided so as to move in an optical axial direction, the second group lens holder 11 shifts in conformity to the amount of shift of the second group cam 27 in the optical axial direction accompanying the rotation of the moving cam ring 19. In addition, the second group lens holder 11 includes two magnetically driven apparatuses.

Figure 3A:
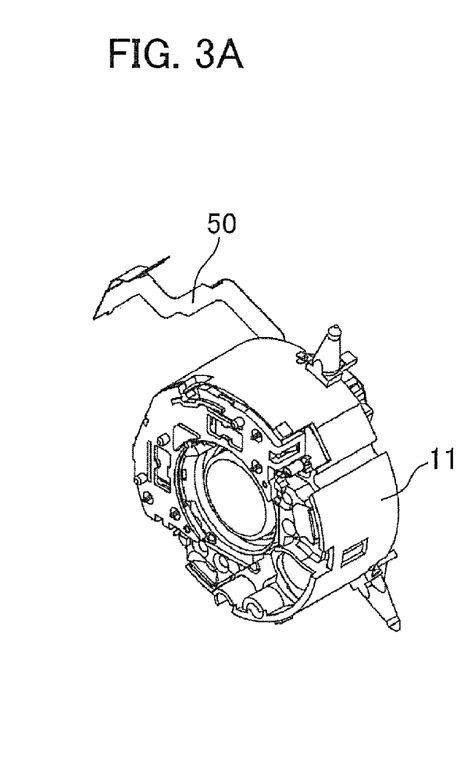
FIGS. 3A and 3B are drawings that show a magnetically driven apparatus provided in a second group lens holder.
Figure 3B:
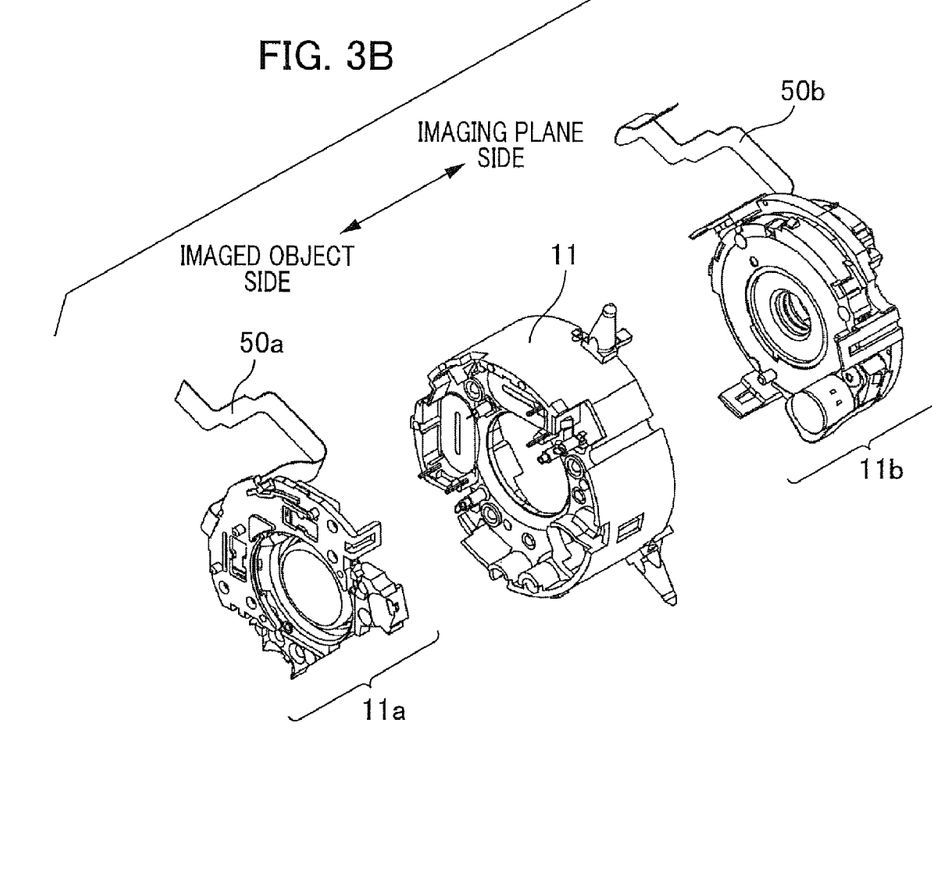

FIGS. 3A and 3B are drawings that show the magnetically driven apparatus that is provided on the second group lens holder 11. As shown in FIG. 3B, an anti-shake apparatus 11a is disposed on the imaged object side of the second lens holder 11, and an diaphragm shutter apparatus 11b that adjusts the amount of light is disposed on the imaging plane side. The anti-shake apparatus and the diaphragm shutter apparatus are each magnetically driven apparatuses. These magnetically driven apparatuses are installed longitudinally with respect to the second group lens holder 11 as shown by the arrow in FIG. 3B. A flexible substrate 50a and a flexible substrate 50b, which are flexible substrates for establishing an electrical connection between the inside and the outside of the lens barrel, are respectively provided on the anti-shaking apparatus 11a and the diaphragm shutter apparatus 11b. Specifically, the flexible substrate 50a and the flexible substrate 50b are respectively electrically connected to the anti-shake apparatus 11a and the diaphragm shutter apparatus 11b. As shown in FIG. 3A, in the second group lens holder 11 having a magnetically driven apparatus attached, the flexible substrate 50a and the flexible substrate 50b are drawn to the same position, and are grouped together as the flexible substrate 50.

Returning to FIG. 2, drive pins 28, which are provided at three locations separated by equal angles on the outer surface of the moving cam ring 19 and project from the outer surface of the stationary cam ring 17, are inserted through cam holes 29 that pass from the inner surface to the outer surface of the stationary cam ring 17. The paths of the cam 21 and the cam hole 29 are identically shaped. In addition, the drive pins 28 maintain a state in which they project along the path of the cam holes 29 with respect to a rotational extending movement of the moving cam ring 19 with respect to the stationary cam ring 17.

The drive ring 30 is a cylindrical member that drives the lens barrel by rotating. The drive ring 30 fits over the outer surface of the stationary cam ring 17 and is supported so as to rotate freely. On the inner surface of the drive ring 30, grooves 31 extending in an optical axial direction are disposed at three locations separated by equal angles, and each of the grooves 31 is formed so as to engage the drive pins 28. Thereby, the rotation of the drive ring 30 is transferred to the moving cam ring 19 via the grooves 31 and the drive pins 28. This drive ring 30 includes a trough groove 35 and a strobe cam 30a. The through groove 35 is a first groove portion through which the flexible substrate 50 is passed from the inside to the outside of the lens barrel by passing through the drive ring 30. In addition, the strobe cam 30a is a second groove provided on the outer circumferential side of the drive ring 30. The strobe cam 30a transfers the drive force to external apparatuses.

The first group lens holder 10, the second group lenses holder 11, the rectilinear guide plate 12, the stationary cam ring 17, the moving cam ring 19, and the drive ring 30 are integrally formed, and each moves in cooperation with the others. In addition, these integrated components are incorporated into the barrel base 32. Furthermore, an imaging element holder 33 that holds imaging elements (not illustrated) is fastened so as to incorporate the flange portion of the stationary cam ring 17 along with the barrel base 32 to form the lens barrel.

A drive source 44 of the lens barrel is an electromagnetic motor that converts electrical power into drive force. The drive force of the drive source 44 is transferred to a drive ring gear 46 that is provided on the outer surface of the drive ring 30 via a gear train 45. Thereby, the drive ring 30 can be rotated according to the electric power supplied to the drive source 44 from the imaging apparatus main body.

Figure 4:
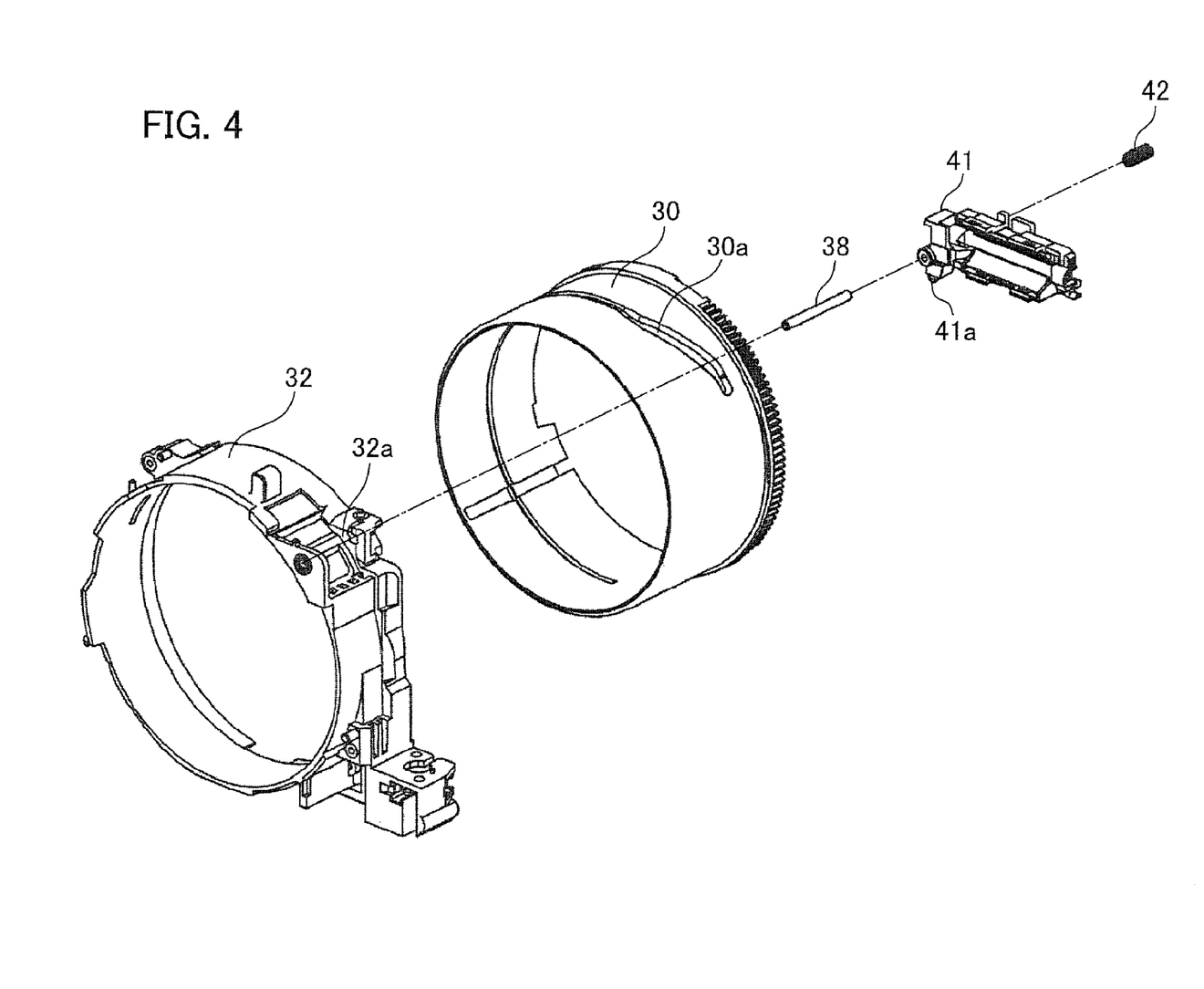
FIG. 4 is an example in exploded perspective view of a strobe provided on the imaging apparatus.

FIG. 4 is an example in exploded perspective view of a strobe that is provided on the imaging apparatus of the first embodiment. This strobe is a light emitting unit that can zoom. As shown in FIG. 4, a shaft 38 is installed in the barrel base 32, and a strobe holder 41 that integrally extends and retracts a xenon tube and a reflecting umbrella slidably engages the shaft 38. The strobe holder 41 is a holding member that holds the strobe. In order to eliminate rattling in the strobe holder 41, a compressed spring 42 is disposed so as to be interposed between the back end 32a of the barrel base 32 and the strobe holder 41. This compressed spring 42 always urges the strobe holder 41 toward the imaged object side. The cam follower 41a, which is provided in the strobe holder 41, is a following portion that follows by engaging a sloped portion of the strobe cam 30a. Therefore, the strobe holder 41 functions as a movable member in which a cam follower 41a moves along the strobe cam 30a integrally with the cam follower 41a by following the strobe cam 30a.

Figure 5A:
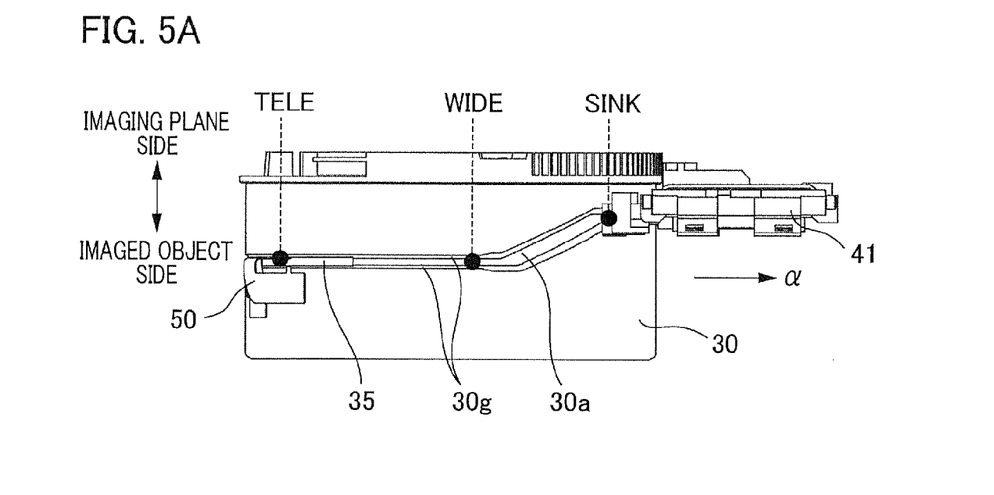
FIGS. 5A to 5C are drawings for explaining the shifting of a strobe holder according to the use position of the imaging apparatus.
Figure 5B:
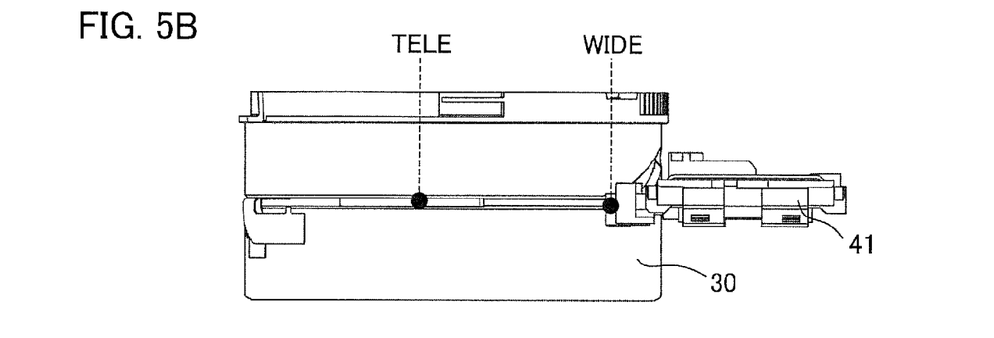
Figure 5C:
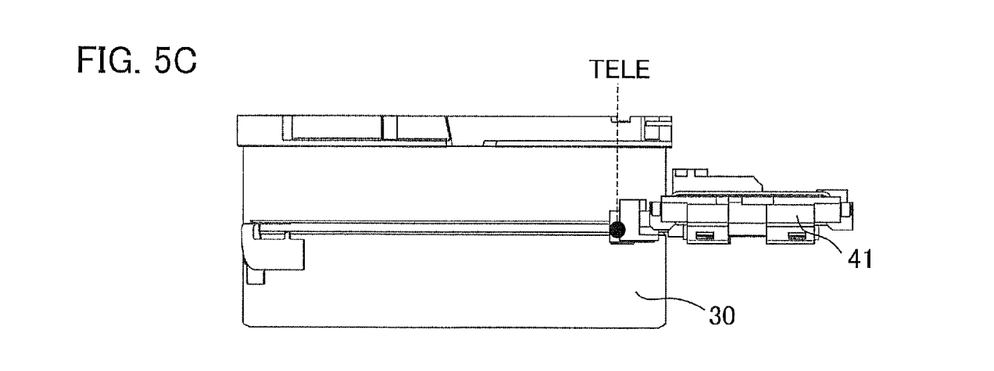

FIGS. 5A to 5C are drawings for explaining the shifting of the strobe holder according to the use position of the imaging apparatus. FIG. 5A shows the SINK position and FIG. 5B shows the WIDE position. FIG. 5C shows the TELE position. The TELE position corresponds to a telescopic state of the zoom lens mechanism that is provided in the imaging apparatus.

The strobe cam 30a is extended toward the imaged object side from the SINK position to the WIDE position. In addition, between the WIDE position and the TELE position, in which the imaging apparatus is actually used, a small amount is lift is applied to the strobe cam 30a so that the imaging apparatus moves slightly toward the imaging plane side depending on the extension of the TELE position. This is in order to change the degree of focus of the strobe light depending on the use position of the imaging apparatus and to adjust the brightness of the subjects when their distances are different. Thereby, when the drive ring 30 rotates in the a direction shown in FIG. 5A, the strobe holder 41 moves along the strobe cam 30a integrally with the cam follower 41a, and extends toward the image object from the SINK position to the WIDE position. In addition, the strobe holder 41 gradually moves toward the imaging plane side from the WIDE position to the TELE position.

The through groove 35, trough which the flexible substrate 50 is passed, and the strobe cam 30a are disposed so as to coincide in the rotation direction of the drive ring 30. In the example that is shown in FIG. 5A, between the WIDE position and the TELE position, the through groove 35 is disposed so as to coincide with the strobe cam 30a. The bottom of the strobe cam 30a, which has a bottom, ends at the through groove 35, but the inclined portions 30g of the strobe cam 30a are similarly smoothly linked at the area of the through groove 35. That is, a beveled portion on the outer circumference of the through groove 35 and the inclined surfaces 30g of the strobe cam 30a are continuously linked in the rotation direction of the drive ring 30. Thus, the beveled portion on the outer circumference of the through groove 35 and the inclined surfaces 30g of the strobe cam 30a have the same angle. Thereby, because the cam follower 41a (refer to FIG. 4) of the strobe holder 41 shifts after engaging the inclined portions 30g of the strobe cam 30a, operation can be carried out irrespective of the presence of the cam bottom.

Note that in the case in which the cam follower 41a provided on the strobe holder 41 contacts both of the two inclined surfaces of the inclined portions 30g of the cam, the through groove 35 may be provided between the starting point of the inclined surface on the imaged subject side and the end point of the inclined surfaces on the imaging plane side. In addition, in the case in which the cam follower 41a contacts only the inclined surface on the imaged object side, the through groove 35 may be provided such that the end of the through groove 35 is positioned more towards the imaging plane side than the starting point of the inclined surface of the imaged subject side. In addition, in the case in which the cam follower 41a contacts only the inclined surface of the imaging plane side, the through groove 35 may be provided such that the end portion of the through groove 35' is positioned more toward the imaged subject side than the end point of the inclined surface of the imaging plane side. Due to such an arrangement, the cam follower 41a can be prevented from becoming stuck in the through groove 35.

In the SINK position state that is shown in FIG. 5A, the flexible substrate 50 is inserted at the TELE position of the strobe cam 30a, and the inclined portion 30g of the strobe cam 30a at this position have a beveled profile that prevents the flexible substrate 50 from being damaged. Identical inclined portions 30g pass the TELE position from the end portion of the SINK position of the strobe cam 30a to enter the area of the through groove 35 and connect to the end portion of the through groove 35. Thereby, the function of the strobe cam 30a to shift the strobe holder 41 and the function of the strobe cam 30a to prevent flexible substrate from being cut while the drive ring 30 rotates are balanced. In the TELE position state that is shown in FIG. 5C, in the area of the through groove 35 through which the flexible substrate is inserted, the cam follower 41a of the strobe holder 41 is inserted. That is, depending on the state of the imaging apparatus having a non-imaging state and an imaging state, the flexible substrate 50 and the cam follower 41a pass through the area in which the through groove 35 and the strobe cam 30a coincide. In other words, the flexible substrate 50 and the cam follower 41a share the area in which the through groove 35 is provided.

Figure 6:
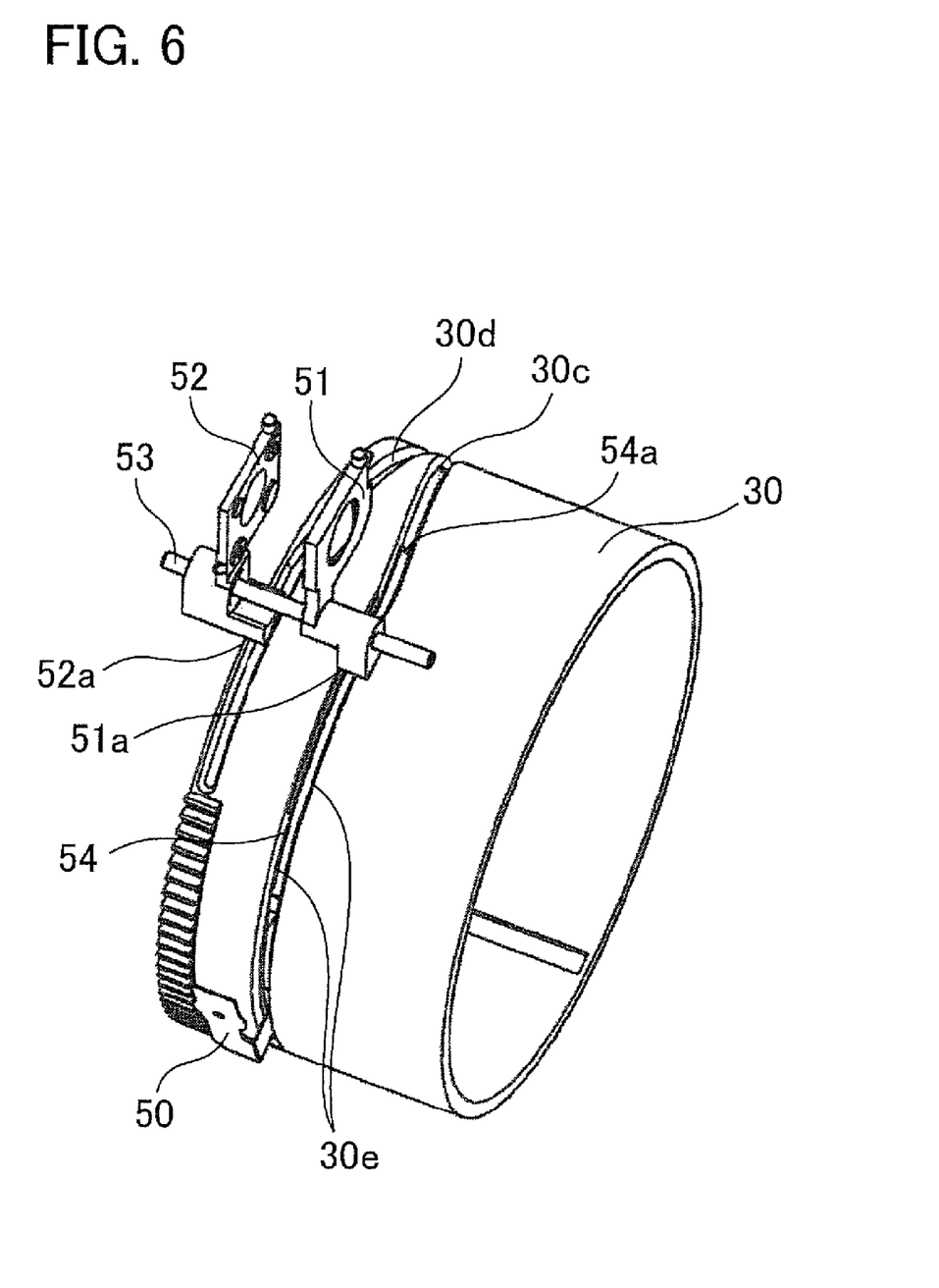
FIG. 6 is a drawing that shows an example of a viewfinder lens provided in the imaging apparatus.

FIG. 6 is a drawing that shows an example of the viewfinder lens that is provided on the imaging apparatus of the first embodiment. The viewfinder lenses that are shown in FIG. 6 are movable portions, and a structure that is similar to the structure of the strobe explained with reference to FIG. 4 is used.

The drive ring 30 that is shown in FIG. 6 includes a viewfinder cam 30c that shifts the viewfinder lens 51 and a viewfinder cam 30d that shifts the viewfinder lens 52. A shaft 53 that extends and retracts the viewfinder lenses 51 and 52 only in an optical axial direction passes through so as to slidably engage the viewfinder lenses 51 and 52. The viewfinder lenses 51 and 52 are thereby fastened to a base member (not illustrated). An expansion spring (not illustrated) is attached between the viewfinder lenses 51 and 52 to urge them to move toward each other and eliminate rattling. In addition, 51a and 51b are cam followers respectively corresponding to the viewfinder lenses 51 and 52, and have a function that is similar to the cam follower 41a that was explained with reference to FIG. 4. That is, the cam followers 51a and 51b respectively engage the viewfinder cams 30c and 30d, and shift by being linked to the rotation of the drive ring 30. Thereby, the viewfinder lenses 51 and 52 can respectively be shifted with the cam followers 51a and 52a by integrally linking to the rotation of the drive ring 30.

In addition, due to the drive ring 30 rotating, the viewfinder lenses 51 and 52 are extended and retracted in an optical axial direction, and magnification is carried out in coordination with the other viewfinder lens (not illustrated). The flexible substrate 50 of the second group lens holder 11 explained with reference to FIG. 3 is extracted from the inside to the outside of the barrel by passing through the through groove 54 formed so as to coincide with the viewfinder cam 30c. This through groove 54 begins from the portion (the end portion 54a of the through groove) providing the lift of the viewfinder cam 30c for the viewfinder lens 51, and is elongated so as to equal the length of the rotation angle of the rotation ring 30 or more. The inclined portion 30e of the cam acts as a beveling for the flexible substrate 50. The through groove 54 is provided at a portion of a large viewfinder cam 30c providing a lift for the viewfinder lens 51. However, in the range that allows correspondence to the length of the flexible substrate 50, the through groove 54 may also coincide with the lift portion. In the example that is shown in FIG. 6, the beveled portions of the outside circumference of the through groove 54 and the inclined surface of the viewfinder cam 30c are continuously linked in the rotation direction of the drive ring 30. In addition, depending on the state of the imaging apparatus having a non-imaging state and an imaging state, the flexible substrate 50 and the cam follower 51a pass through an area in which the through groove 54 and the viewfinder cam 30c coincide.

In the present embodiment, although the width of the cam bottom and the width of the through groove 35 for the flexible substrate 50 have substantially equal dimensional relationship, if the inclined portion of the cam that engages the follower is assured, a through groove may be formed inside the broad cam width. In addition, a broad through groove may be used so as to be eliminated midway on the inclined portion of the cam. According to the imaging apparatus of the first embodiment described above, a groove portion used in the driving of a zoom strobe or viewfinder lenses and the groove though which the flexible substrate is passed can be laid out in a cylindrical member (drive ring 30) that drives the lens barrel without enlarging the imaging apparatus.

An imaging apparatus of a second embodiment of the present invention will be explained with reference to FIGS. 7A to 10C. This imaging apparatus is a camera that is equipped, for example, with a pop-up light emitting unit 1. The light emitting unit 1 is, for example, a strobe. Note that the lens barrel of the imaging apparatus of the second embodiment has a structure that is similar to the lens barrel of the imaging apparatus of the first embodiment that was explained with reference to FIG. 2. In addition, the strobe cam 30a and the through groove 35 that were explained with reference to FIG. 5 are provided on the drive ring 30 provided in this imaging apparatus.

Figure 7A:
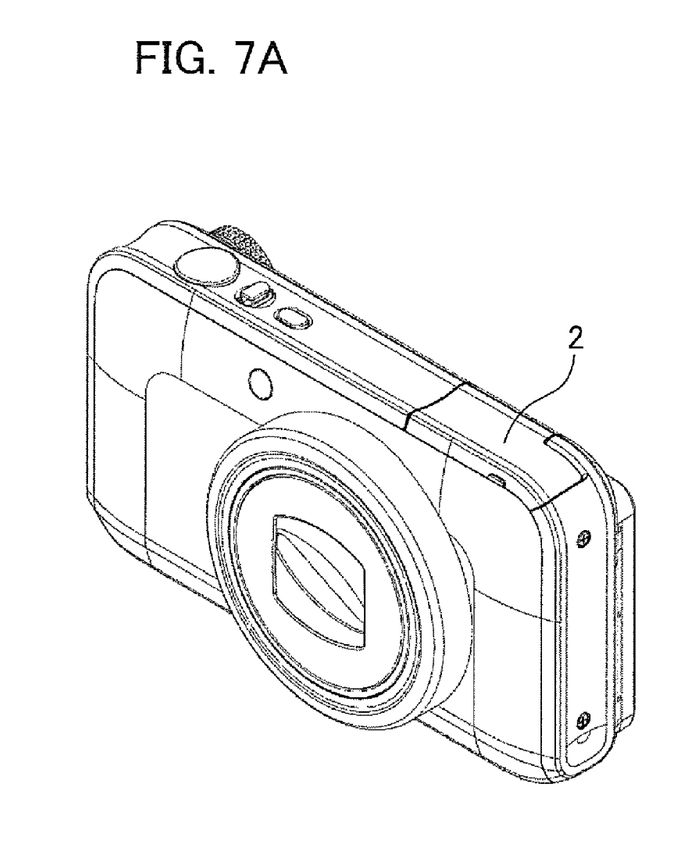
FIGS. 7A and 7B are examples in perspective view of the external appearance of the imaging apparatus.
Figure 7B:
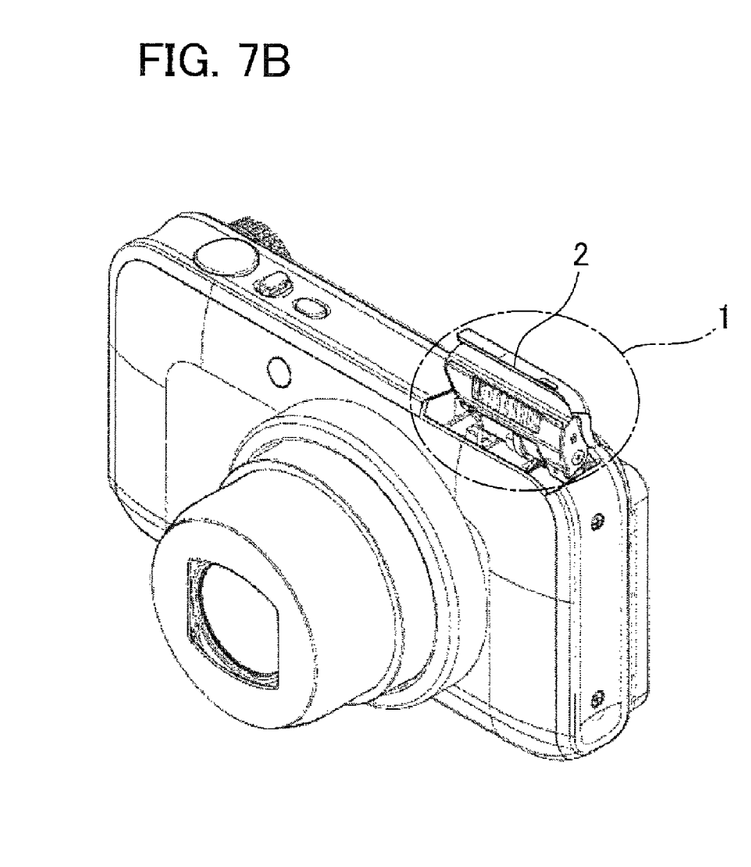

FIGS. 7A and 7B show an example of an external perspective view of the imaging apparatus of the second embodiment. FIG. 7A shows the imaging apparatus when it is in a non-imaging state. In FIG. 7B, the imaging apparatus is in a state in which the power source has been turned ON. In the state shown in FIG. 7B, the light emitting unit 1 shown in the broken line portion projects above the imaging apparatus and the imaging apparatus can emit light. The light emitting unit 1 is structured from a plurality of components such as the cover member 2 that forms a portion of the upper surface of the imaging apparatus. The light emitting unit 1 is linked to the drive ring 30 (refer to FIG. 2) of the lens barrel that is positioned at the center of the imaging apparatus, and transitions from a stored state to extended state or, conversely, from a extended state to a stored state.

Figure 8:
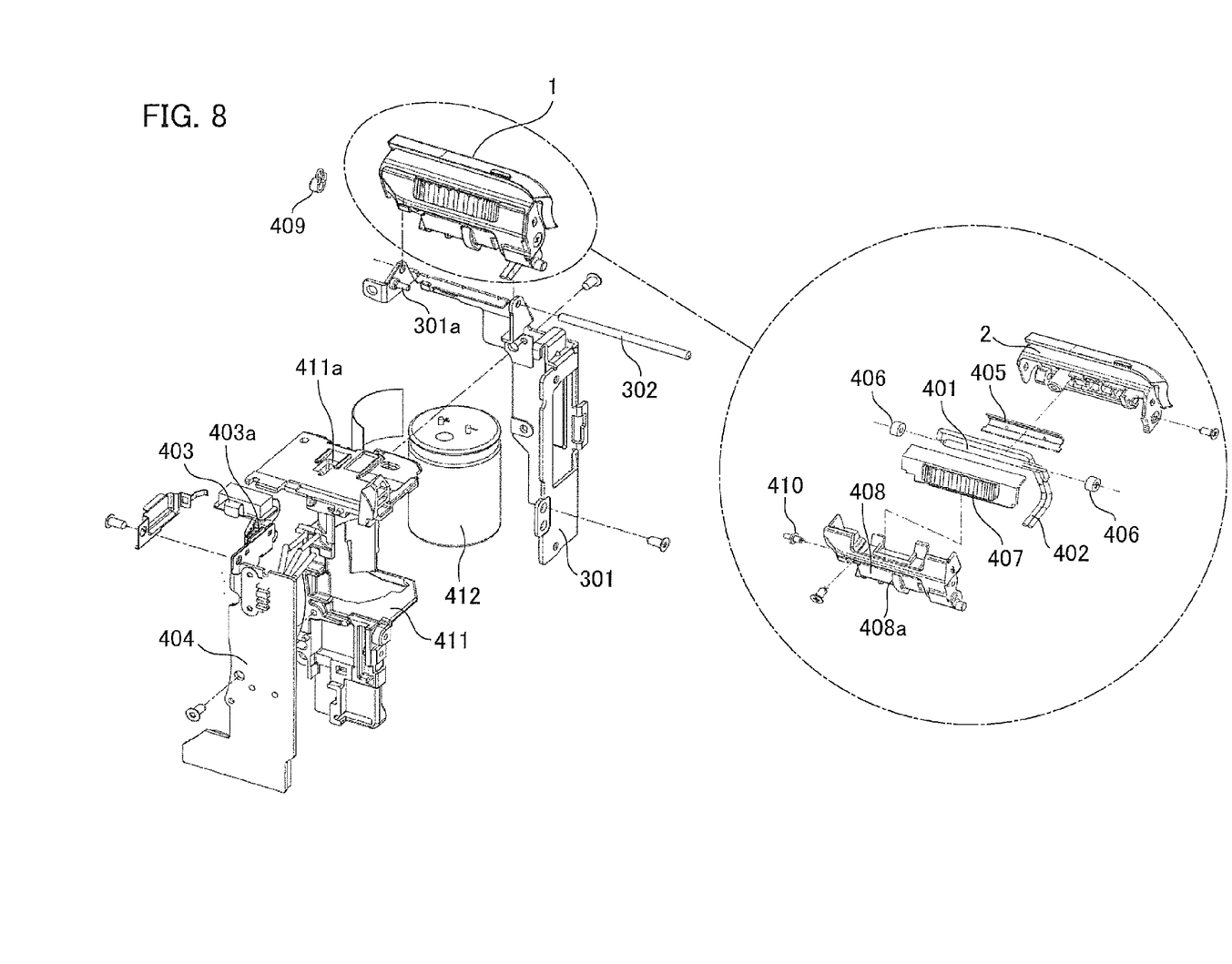
FIG. 8 is an example in exploded perspective view of a light emitting unit.

FIG. 8 is an example of an exploded perspective view of the light emitting unit 1. The xenon tube 401 that is shown in FIG. 8 is a light emitting body, is electrically connected by a lead line 402, and is wired to a strobe substrate 404 that carries out light emission control via the flexible substrate 403. A light reflector 405 focuses light from the xenon tube 401. Xenon tube rubbers 406 have the function of insulating the end portions of the xenon tube 401 and urging the xenon tube 401 toward the light reflector 405 side. A prism panel 407 reflects the light from the xenon tube 401 and the light reflector 405 to the desired imaging range. In order to achieve this, the prism panel 407 is furnished with an incident surface and an emitting surface. The components related to light emission such as the xenon tube 401, the prism panel 407, the xenon tube rubbers 406, and the light reflector 405 are incorporated into the strobe holder 408. In addition, a shaft 410 is lightly press fit into the strobe holder 408. The shaft 410 is hooked to one end of a toggle spring 409 that urges the strobe shaft 302 toward the rotational center and urges the light emitting unit 1 in the projection direction and the storage direction. The other end of the toggle spring 409 is hooked to a shaft 301a that is provided in a strobe base 301. A base member 411 is a member for installing the flexible substrate 403, the strobe substrate 404, and the strobe capacitor 412. The base member 411 is fastened by a screw to the strobe base 301, and forms the light emitting unit 1.

A lever-type detecting switch (below, referred to as a "switch") 403a detects whether or not the light emitting unit 1 is in either of the projecting or storage positions in the imaging apparatus. The switch 403a is disposed in a hole 411a provided in the base member 411. The switch 403a is mounted on the flexible substrate 403. When the projection 408a of the strobe holder 408 presses the lever of the switch 403a, it is detected that the light emitting unit 1 is in a storage state, and the imaging apparatus transitions to the non-light emitting state. When the projection 408a separates from the lever of the switch 403a, it is detected that the light emitting unit 1 is in an extended state, and the imaging apparatus transitions to a light emitting state.

Figure 9A:
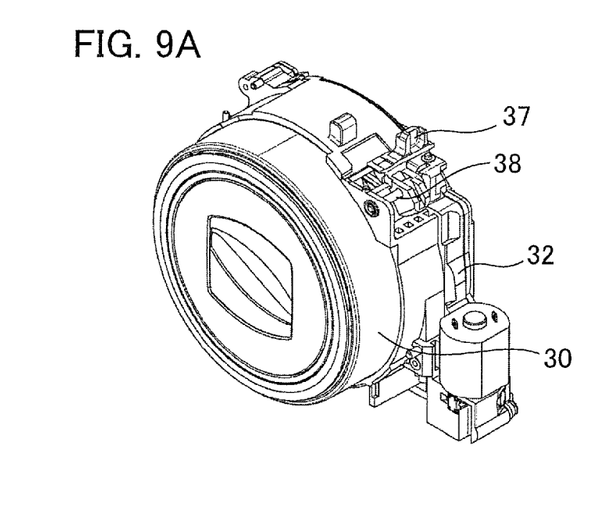
FIGS. 9A to 9C are drawings for explaining the linking between the lens barrel and a light emitting unit.
Figure 9B:
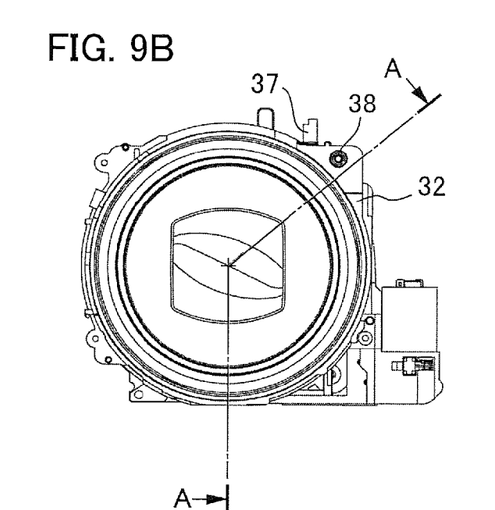
Figure 9C:
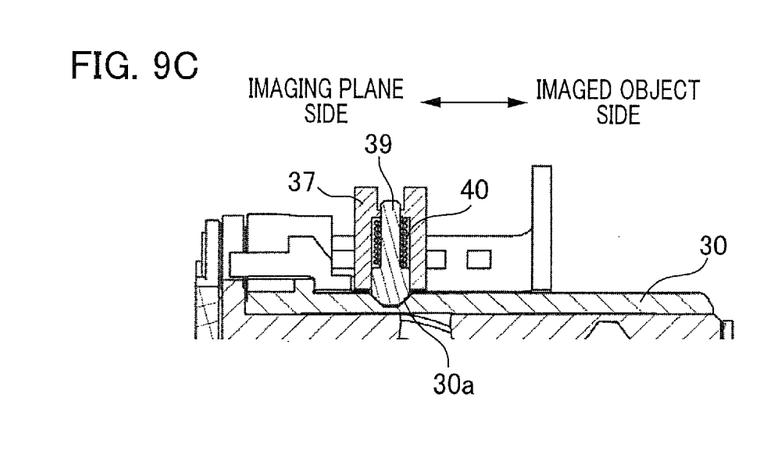

FIGS. 9A to 9C are drawings that for explaining the linkage between a lens barrel and a light emitting unit. FIG. 9A shows a perspective view of the lens barrel in a state in which the drive mechanism is installed on the light emitting unit 1 in the lens barrel. The slider 37 is guided by the slider shaft 38 supported by the barrel base 32, and it is supported so as to be able to move in an optical axial direction.

FIG. 9B is a front view of the lens barrel that is shown in FIG. 9A. FIG. 9C is a cross-sectional view along A-A of the lens barrel that is shown in FIG. 9B. FIG. 9C shows a cross-section of locations engaged with the drive ring 30, which is the drive source of the slider 37. As shown in FIG. 9C, an inelastic movable slider follower 39 is accommodated in a tubular guide portion that is provided on the slider 37 and is perpendicular to the optical axis. The slider follower 39 is urged toward the strobe cam 30a provided on the outer surface of the drive ring 30 by a compressed spring 40, and is cam-engaged. The slider follower 39 that is cam-engaged to the strobe cam 30a follows this strobe cam 30a. Due to the drive ring 30 rotating centered on the optical axis, the slider 37, which operates integrally with the slider follower 39, moves in an optical axial direction via the strobe follower 39, and then cam-engages the strobe cam 30a. That is, the slider 37 is a movable member that moves along the strobe cam 30a due to the slider follower 39 following the strobe cam 30a. As explained with reference to FIG. 10, accompanying the movement of the slider 37, the light emitting unit 1 transitions from a stored state to a extended state or from a extended state to a stored state. Therefore, the state of the light emitting unit 1 transitions by linking to the rotation of the drive ring 30.

Figures 10A, 10B:
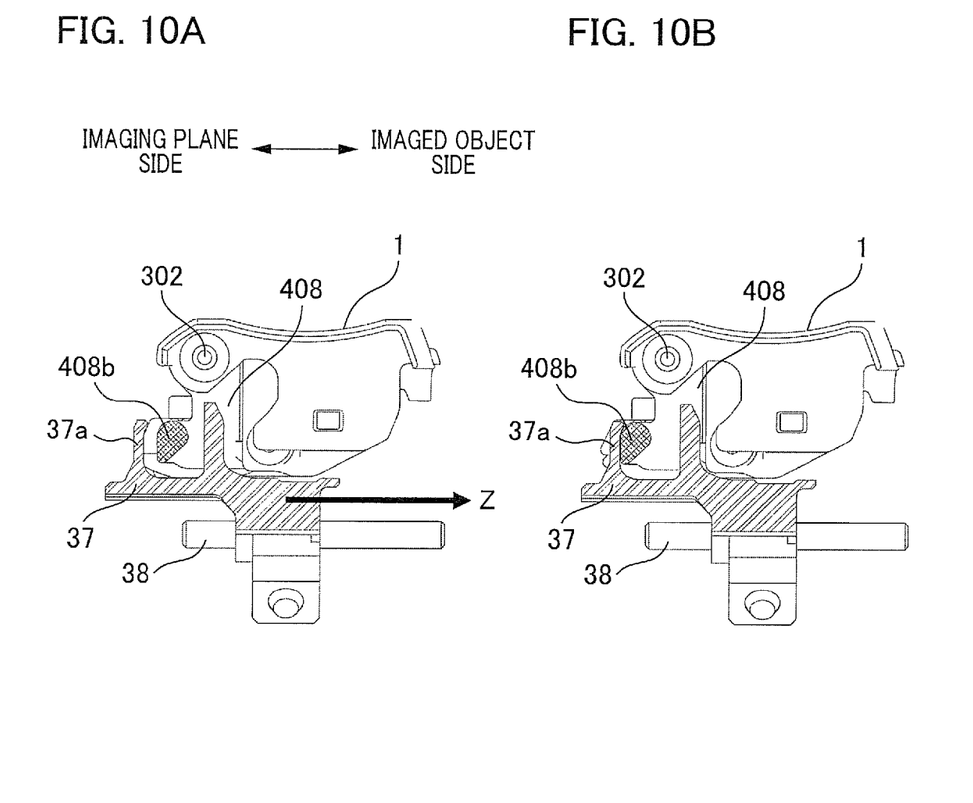
FIGS. 10A to 10C is a drawing for explaining the transitions between the states of the light emitting unit.
Figure 10C:
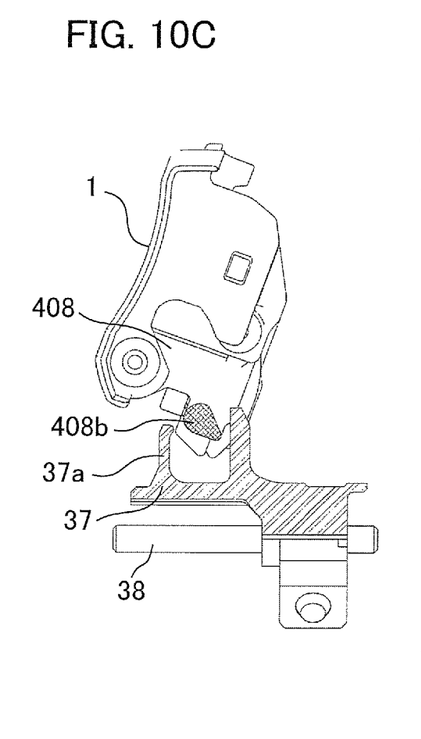

FIGS. 10A to 10C are drawings for explaining the transition of the states of a light emitting unit. FIG. 10A shows the storage state of the light emitting unit 1. The storage state is the state in which the light emitting unit 1 is stored. FIG. 10B shows the state in which the slider 37 abuts the projection 408b of the strobe holder 408. FIG. 10C shows the extended state of the light emitting unit 1. The extended state is the state in which the light emitting unit 1 is extended with respect to the imaging apparatus, that is, the state during which the light emitting unit 1 is in use. The light emitting unit 1 is stably supported in the respective storage state and extended state by a torque spring 409 that switches the direction in which the light emitting unit 1 is urged between the storage state and the extended state.

As shown in FIG. 10A, the U-shaped unit 37a of the slider 37 is formed so as to sandwich the projection 408b that projects from the strobe holder 408 provided on the light emitting unit 1. That is, the slider 37 is a holding member that holds the light emitting unit 1. The slider 37 presses the projection 408b accompanying its movement in the optical axial direction Z (refer to FIG. 10B), and a rotating force that is centered on the strobe shaft 302 is applied to the light emitting unit 1. This rotating force overcomes the urging force of the torque spring 409 to raise the light emitting unit 1 and to switch the urging direction of the torque spring 409. Thereby, as shown in FIG. 10C, the light emitting unit 1 transitions to the extended state. When the light emitting unit 1 transitions from the extended state to the storage state, an operation is carried out that is the reverse of the operation carried out when the light emitting unit 1 transitions from the storage state to the extended state. According to the imaging apparatus of the second embodiment, the groove portion used in the drive of the pop-up light emitting unit 1 and the groove portion through which the flexible substrate is passed can be laid out in a cylindrical member (the drive ring 30) that drives the lens barrel without enlarging the imaging apparatus.

FIGS. 11A to 11D and 12 are drawings for explaining a third embodiment of the present invention. In the third embodiment, the strobe cam 30*f* is provided as a third groove portion at a position on the outer circumference side of the drive ring 30 that is provided on the imaging apparatus separated on the imaging plane side from the through groove 35 (the first groove portion) and the strobe cam 30*a* (the second groove portion). The strobe follower 39 provided on the slider 37 that holds the light emitting unit of the imaging apparatus can engage and follow the strobe cam 30*f*. The slider 37 can move along the strobe cam 30*f* due to the strobe follower 39 engaging and following the strobe cam 30*f*.

In the third embodiment, the strobe follower 39 can be manually transitioned from the state of engagement in the strobe cam 30*a* to a state of engagement with the strobe cam 30*f*. In addition, conversely, the strobe follower 39 can be manually transitioned from a state of engagement in the strobe cam 30*f* to a state of engagement in the strobe cam 30*a*.

Figure 11A:
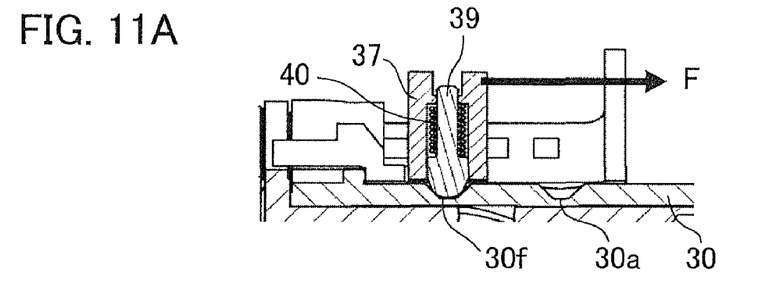
FIGS. 11A to 11D are figures showing the operation when the slider is manually moved in the optical axial direction.
Figure 11B:
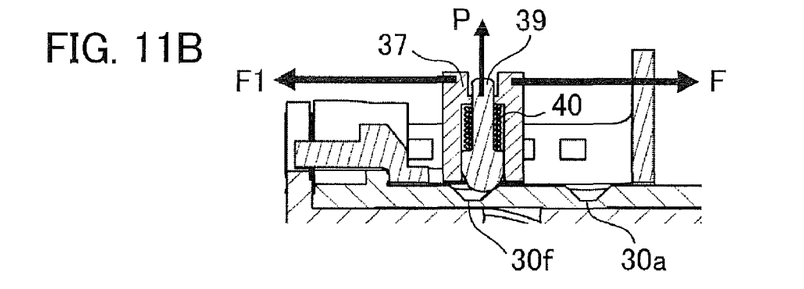

Below, the operation when the slider 37 is manually moved in an optical axial direction will be explained for the case in which the drive ring 30 is in a stopped state with reference to FIGS. 11A to 11D. FIG. 11A shows a state in which the strobe follower 39 is engaged with the strobe cam 30*f*. When the user of the imaging apparatus manually applies a weight F in an optical axial direction to the slider 37 in the state that is shown in FIG. 11A, as shown in FIG. 11B, the strobe follower 39 rides over the top of the inclined surface of the strobe cam 30*a*. Due to the strobe follower 39 riding over the top of the inclined surface of the strobe cam 30*f*, the strobe follower 39 overcomes the pressing force of the compressed spring 40 in the slider 37, and moves in the direction P in FIG. 11B.

Figure 11C:
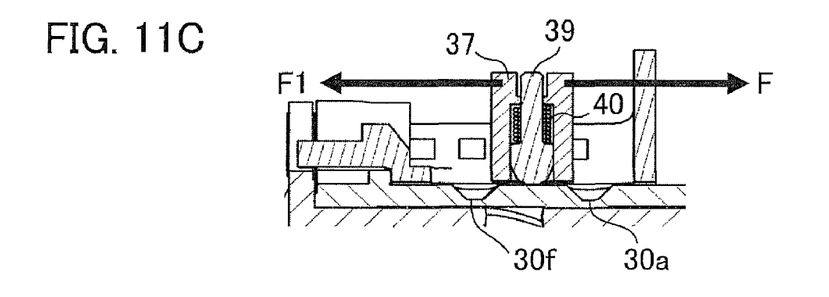
Figure 11D:
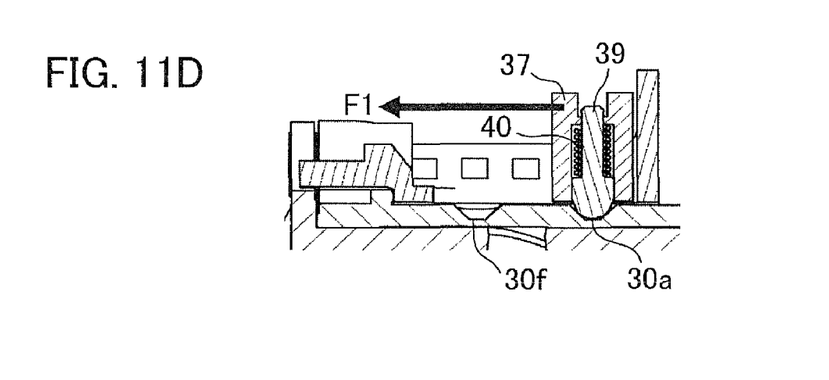

When the user applies a heavier weight F to the slider 37, as shown in FIG. 11C, the strobe follower 39 rides from the strobe cam 30*f* over the outer circumferential surface of the drive ring 30. When the user continues to apply a force F from the state shown in FIG. 11C, as shown in FIG. 11D, the strobe follower 39 moves up to and then cam-engages with the strobe cam 30*a*. Similarly, when the user manually continues to apply to the slider 27*a* the weight F1 having vector that is opposite to that of the weight F from the state that is shown in FIG. 11D, the state of the strobe follower 39 transitions from a state in which it is engaged in the strobe cam 30*a* to a state in which it is engaged in the strobe cam 30*f*.

Figure 12A:
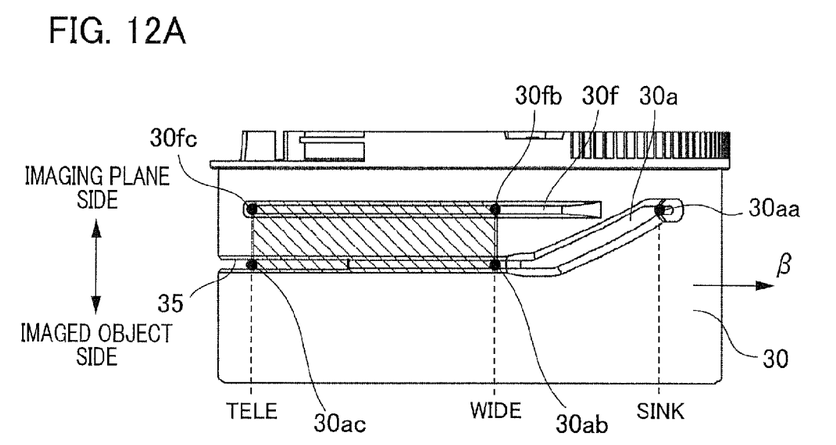
FIG. 12A is a drawing for explaining a third embodiment.

FIG. 12A is a drawing that for explaining the shift of the slider 37 in the third embodiment. The basic action of the strobe follower 39 that is provided in the slider 37 is similar to the action of the cam follower 41*a* that was explained with reference to FIG. 5. In addition, depending on the state of the imaging apparatus having a non-imaging state and an imaging state, the flexible substrate and the slider 37*a* pass through an area in which the through groove 35 and the strobe cam 30*a* coincide. In other words, the flexible substrate 50 and the strobe follower 39 share an area at which the through groove 35 is provided.

When the drive ring 30 rotates in the β direction from the state in which the slider 37 is disposed at the SINK position 30*aa* in FIG. 12A, the strobe follower 39 of the slider 37 moves along the imaging plane side of the cam 30*a*. When the urging force of the torque spring 409 switches, the strobe follower 39 arrives at the WIDE position 30*ab* while abutting at the image object plane side of the cam 30*a*. At this time, the light emitting unit 1 is in an open state. From this state, the user of the imaging apparatus determines that open state the light emitting unit 1 is not necessary, manually closes the light emitting unit 1, switches the torque spring 409, and moves the strobe follower 39 to the position 30*b*. From the state in which the strobe follower 39 is at position 30*fb*, in the case in which the user has determined that the open state of the strobe is again necessary, the user can manually open the light emitting unit 1 and return it from position 30*fb* to position 30*ab*.

When the drive ring 30 further rotates in the β direction from the state in which the strobe follower 39 is in the WIDE position 30*ab*, the open state of the light emitting unit 1 continues to be maintained, and the strobe follower 39 reaches the TELE position 30*ac*. In the case in which the user of the imaging apparatus has determined that the open state of the strobe is not necessary, the user manually closes the light emitting unit 1, switches the torque spring 409, and can then move the strobe follower 39 to position 30*fc*. From the state in which the strobe follower 39 is at position 30*fc*, in the case in which the user has determined that the open state of the strobe is again necessary, the user can also manually open the light emitting unit 1 and return it from position 30*fc* to position 30*ac*.

The strobe cam 30*f* is a cam that is used for maintaining the closed state of the light emitting unit 1 after the urging force of the torque spring 409 has switched. Because the strobe follower 39 can move smoothly on the strobe cam 30*f*, even in the case in which a small external force acts on the slider 37 in an optical axial direction, the unexpected opening of the light emitting unit 1 can be prevented. According to the imaging apparatus of the third embodiment, within the area of the diagonal lines that is shown in FIG. 12A (the area from the WIDE position to the TELE position), the strobe follower 39 can be moved manually in an optical axial direction. In the example shown in FIG. 12A, the range in the optical axial direction of the first and second groove portions 1 and 2 (the through groove 35 and the strobe cam 30*a*), through which the strobe follower 39 can pass, coincides with the range in an optical axial direction of the third grove portion (the strobe cam 30*f*) through which the strobe follower 39 can pass.

Figure 12B:
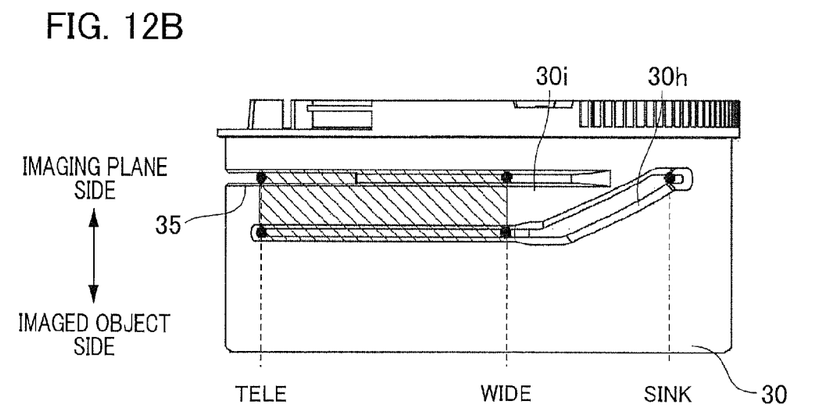
FIG. 12B is a drawing for explaining a fourth embodiment.

FIG. 12B is a drawing that shows a fourth embodiment of the present invention. A through groove 35 (first groove portion), a strobe cam 30*i* (second groove portion), and a strobe cam 30*h* (third groove portion) are provided on the drive ring 30 provided in the imaging apparatus of the fourth embodiment. The strobe cam 30*h* is provided at a position separated from the first and second groove portion on the imaged object side. The through groove 35 through which a flexible substrate passes and the strobe cam 30*i* are disposed so as to coincide in the rotation direction of the drive ring 30. In the example that is shown in FIG. 12A, between the WIDE position and the TELE position, a through groove 35 is disposed so as to coincide with the strobe cam 30*i*. Specifically, the outer circumferential surface beveling of the through groove 35 and the inclined surface of the strobe cam 30*i* are continuously linked in the rotation direction of the drive ring 30.

The user of the imaging apparatus can manually switch from a state in which the strobe follower 39 is engaged in the strobe cam 30*h* to a state in which the strobe follower 39 is engaged in the strobe cam 30*i*. In addition, conversely, the user can manually switch from a state in which the strobe follower 39 is engaged with the strobe cam 30*i* to a state in which the strobe follower 39 is engaged to the strobe cam 30*h*. That is, according to the imaging apparatus of the fourth embodiment, within the area of the diagonal line portion that is shown in FIG. 12B (the area from the WIDE position to the TELE position), the strobe follower 39 can be manually moved in an optical axial direction. In addition, in the example that is shown in FIG. 12B, the range in the optical direction of the first and second groove portions through which the strobe follower 39 can pass coincides with the range in the optical direction of the third groove portion through which the strobe follower 39 can pass.

In addition, in the fourth embodiment as well, according to the state of an imaging apparatus having a non-imaging state and an imaging state, a flexible substrate and a strobe follower 39 pass through a region at which the first groove portion and the second groove portion coincide. After transitioning from a state in which the strobe follower 39 engages the strobe cam 30h, for example, to a state in which the strobe follower 39 engages the strobe cam 30i, when the imaging apparatus has transited to the TELE position, the strobe follower 39 enters the area of the through groove 35 into which the flexible cable is inserted.

According to the third and fourth embodiments described above, the imaging apparatus can be made more compact than a structure in which the through groove through which the flexible substrate passes is positioned at a separate location in an optical axial direction to avoid a plurality of strobe cams being provided on the drive ring 30. Above, the preferred embodiments of the present invention have been explained, but the present invention is not limited by these embodiments. Various modifications and changes within a range that does not depart from the spirit of the invention are possible.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-021725, filed Feb. 3, 2010, which is hereby incorporated by reference herein in its entirety.

What is claimed is:

1. An imaging apparatus comprising:
   a lens barrel including a magnetically driven apparatus and a flexible substrate that is electrically connected to the magnetically driven apparatus; and
   a cylindrical member that drives the lens barrel by rotating, wherein the cylindrical member includes a first groove that passes through the cylindrical member and through which the flexible substrate passes from the inside to the outside of the lens barrel and a second groove provided on the outer circumferential side of the cylindrical member, and
   wherein the first groove and the second groove are disposed so as to coincide in the rotation direction of the cylindrical member.

2. The imaging apparatus according to claim 1, further comprising:
   a follower portion that engages and follows the second groove; and
   a movable member that includes the follower portion and that moves along the second groove due to the follower portion following the second groove,
   wherein an outer circumferential beveled portion of the first groove and an inclined surface of the second groove are continuously linked in the rotation direction of the cylindrical member, and
   wherein the flexible substrate and the follower portion pass through an area in which the first groove and the second groove coincide depending on the state of the imaging apparatus having a non-imaging state and an imaging state.

3. The imaging apparatus according to claim 2,
   wherein a third groove is provided such that the follower portion can engage and follow the third groove at a position on the outer circumferential side of the cylindrical member separated from the second groove on the imaging plane side,
   wherein the movable member moves along the third groove due to the follower portion engaging and following the third groove,
   wherein the follower portion transitions from a state of engagement with the second groove to a state of engagement with the third groove or from a state of engagement with the third groove to a state of engagement with the second groove, and
   wherein the range of the first and second grooves, through which the follower portion can pass, in an optical axial direction coincides with the range of the third groove, through which the follower can pass, in an optical axial direction.

4. The imaging apparatus according to claim 1, further comprising:
   a third groove that is provided at a portion in the outer circumferential side of the cylindrical portion separated from the second groove on the imaged object side;
   a follower portion that engages and follows the second groove and the third groove; and
   a movable portion that includes the follower portion and moves along the second groove and is continuously linked in the rotation direction of the cylindrical member,
   wherein the range of the first and second grooves, through which the follower portion can pass, in an optical axial direction coincides with the range of the third groove, through which the follower portion can pass, in an optical axial direction.

5. The imaging apparatus according to claim 1, wherein the movable member is a viewfinder lens.

6. The imaging apparatus according to claim 1, wherein the movable member is a holding member that holds a light emitting unit.

7. The imaging apparatus according to claim 1, wherein the magnetically driven apparatus is a diaphragm shutter apparatus that adjusts an amount of light.

8. The imaging apparatus according to claim 1, wherein the magnetically driven apparatus is an anti-shake apparatus.

* * * * *